Aug. 17, 1948.
E. G. PRICE
2,447,206
PIPE SHIPPING PACKAGE AND METHOD
OF FORMING THE SAME
Filed Sept. 25, 1945
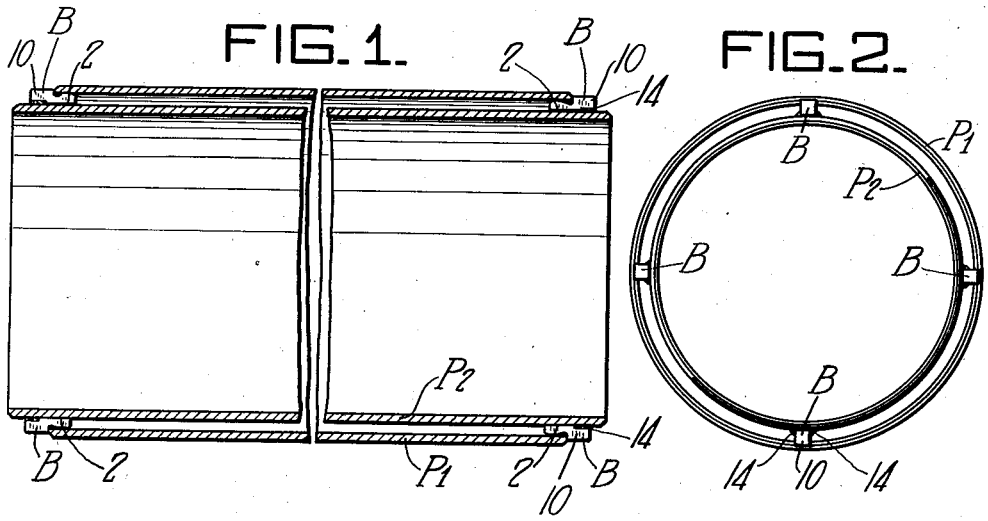
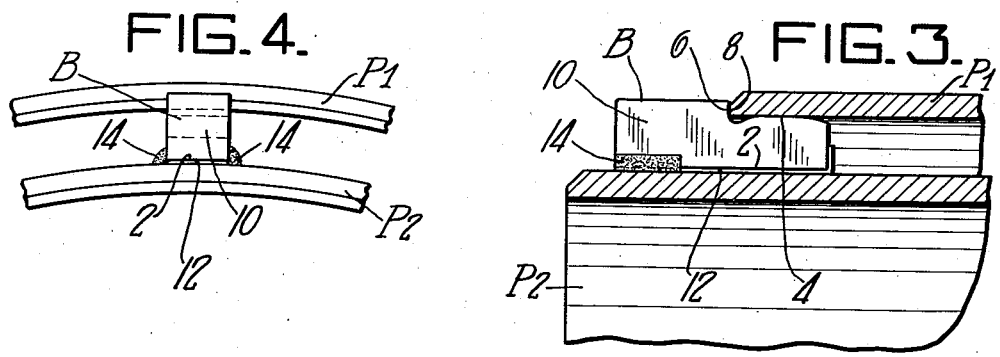
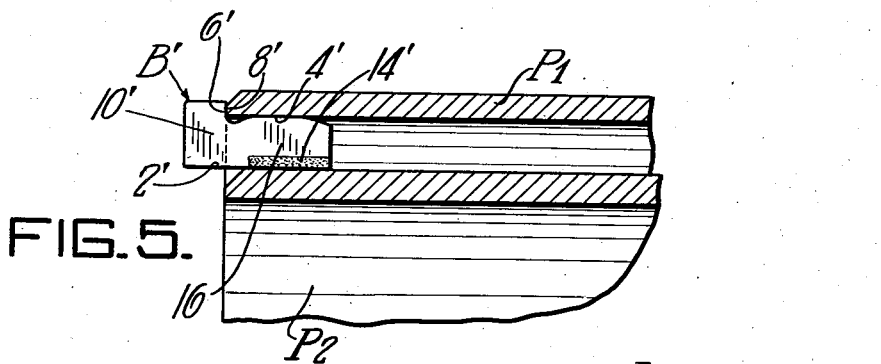
Inventor:
EDMUND G. PRICE,
by: Donald G. Dalton
his Attorney.

Patented Aug. 17, 1948

2,447,206

UNITED STATES PATENT OFFICE 2,447,206

PIPE SHIPPING PACKAGE AND METHOD OF FORMING THE SAME

Edmund G. Price, Mount Lebanon, Pa., assignor to National Tube Company, a corporation of New Jersey Application September 25, 1945, Serial No. 618,477

3 Claims. (Cl. 206—65)

This invention relates to the packaging of pipe for shipment and more particularly to packages consisting of telescoped lengths of pipes.

In the transportation of tubular products, such as pipe, it is desirable, where space is at a premium to telescope or nest the products together, if lengths of different diameter are being shipped. Since large diameter pipe are generally in so-called "random" lengths, it is necessary to nest pipe of unequal lengths.

It is accordingly, an object of the present invention to provide a means of securely nesting pipe of unequal lengths.

It is a further object to provide a package of telescoped pipes which are securely fixed against relative movement.

It is another object to provide a simple method of nesting pipe for shipment.

The foregoing and further objects of the present invention will be apparent from the specification and drawing, wherein:

Figure 1 is a sectional view of telescoped pipes which have been packaged for shipment in accordance with my invention;

Figure 2 is an end view of Figure 1;

Figure 3 is an enlarged view showing a bearing member or separator in more detail;

Figure 4 is an end view of Figure 3; and

Figure 5 is a section, partly broken away, of a modification.

Referring more particularly to the drawing, the letters P1 and P2 designate telescoped lengths of pipe of unequal length. A plurality of L-shaped bearing members B are disposed between the end portion of the outer pipe and the inner pipe. These bearing members are relatively thick having a width of 1½ to 2" for large diameter pipe. The bearing members have an inner bearing surface 2 which bears on the outside of the inner pipe and an outer bearing surface 4 which contacts the inside of the outer pipe. A shoulder 6 at about the mid-portion of the bearing member B determines the end of the bearing surface 4 and abuts the end 8 of the outer pipe P1. The shoulder 6 should be at least ⅛" in height and preferably ¼" or greater but should be slightly less than the thickness of the outer pipe so that it does not extend therebeyond. The bearing members extend outwardly a considerable distance from the shoulder to provide an offset portion 10. The offset portion 10 being of considerable length provides a large length of the bearing member beyond the outer pipe in contact with the inner pipe. If desired, shims 12 may be positioned between the bearing blocks and inner pipe to insure a tight fit so that there will be no lost motion therebetween. The bearing blocks B are retained in position by fillet welds 14 on either side thereof which secure the blocks to the inner pipe P2.

A modified form of bearing block is shown in Figure 5 which is adapted for use with pipes of equal length. In this form, the offset portion 10' is relatively short and the bearing blocks are welded to the inner pipe by weld bead 14' deposited along the inner portion 16 thereof.

In preparing pipes for shipment by my method, two pipes are telescoped together. If desired, additional pipes may be telescoped interiorly or exteriorly thereof. At least three spacers or bearing blocks B or B' are then inserted between the telescoped pipes and are equally spaced in the annular space therebetween with the shoulders 6 abutted against the end 8 of the outer pipe. If necessary, shims 12 are positioned between the blocks and the inner pipe. Thereafter, a portion of the pipe adjacent the bearing blocks is heated to about 400° F. and the blocks are then fillet welded to the inner pipe. The pipes are thus rigidly secured together and will withstand all kinds of shipping conditions. Despite severe rail shipping conditions, the pipes will not move relative to each other. In disassembling the nested pipes, the weld bead is knocked off with an air hammer or the like, and the surface ground or filed smooth. Due to the preheat, the metal is not deleteriously affected by the welding.

While I have shown and described two specific embodiments of my invention, it will be understood that these embodiments are merely for the purpose of illustration and description and that various other forms may be devised within the scope of my invention, as defined in the appended claims.

I claim:

1. A pipe shipping package comprising at least two telescope pipes, a plurality of elongated bearing members disposed between the end portion of the outer pipe and the inner pipe, said bearing members having an outwardly extending shoulder engaging the end of the outer pipe, said bearing members being secured to said inner pipe.

2. A pipe shipping package comprising at least two telescoped pipes, a plurality of elongated bearing members disposed between the end portion of the outer pipe and the inner pipe, said bearing members having an outwardly extending shoulder engaging the end of the outer pipe, said bearing members being welded to said inner pipe.

3. A pipe shipping package comprising at least two telescope pipes, a plurality of elongated bearing members disposed between the end portion of the outer pipe and the inner pipe, said bearing members having an outwardly extending shoulder engaging the end of the outer pipe, the height of said shoulders being at least slightly less than the wall thickness of said outer pipe, said bearing members being secured to said inner pipe.

EDMUND G. PRICE.